United States Patent [19]

Huggins et al.

[11] 4,073,860
[45] Feb. 14, 1978

[54] PRECIPITATION OF FILTERABLE NICKEL AND/OR COBALT SULFIDES FROM ACID SOLUTIONS

[75] Inventors: David A. Huggins, Sudbury; Norman C. Nissen, Toronto, both of Canada

[73] Assignee: The International Nickel Company, Inc., New York, N.Y.

[21] Appl. No.: 381,861

[22] Filed: July 23, 1973

[30] Foreign Application Priority Data

Sept. 11, 1972 Canada ................................. 151413

[51] Int. Cl.$^2$ ..................... C01G 51/00; C01G 53/00
[52] U.S. Cl. ................................. 423/140; 423/101; 423/561 R; 423/561 B
[58] Field of Search ............... 423/140, 142, 143, 101, 423/102, 561; 75/108

[56] References Cited

U.S. PATENT DOCUMENTS 2,722,480  11/1955  Roy ...................................... 423/142

FOREIGN PATENT DOCUMENTS 28,925 of  1902  United Kingdom ................. 423/101

OTHER PUBLICATIONS

Spitchenko et al., "Physical-Chemical Principles of Ni and Co Sulfide Precipitation from Ferriginous Solutions," Chem. Abstracts, vol. 69, 1968, #100048q.

Frescenius; "Quantitative Chemical Analysis," John Wiley & Sons; New York, N. Y., 1891, pp. 161, 163.

Welcher, Editor, "Standard Methods of Chemical Analysis," 6th Ed., vol. II, Part A; DiVan Nostrand Co.; Princeton, N. J., 1963, pp. 98–99.

Wadsworth et al., Ed., "Unit Processes in Hydrometallurgy, " Gordon & Breach, New York, N. Y.; 1964, appropriate pp. 593–615.

*Primary Examiner*—O. R. Vertiz
*Assistant Examiner*—Brian E. Hearn
*Attorney, Agent, or Firm*—Francis J. Mulligan, Jr.; Ewan C. MacQueen

[57] ABSTRACT

A process for the precipitation of metallic sulfides, e.g., nickel, cobalt or zinc sulfides, from aqueous metal-ion-containing solution comprising passing hydrogen sulfide through the metal-containing solution while the solution is at a temperature of about 75° C. and at a pH of about 2 to about 3 and maintaining said pH during the time of hydrogen sulfide addition by continuous addition of alkali to the solution. The precipitated metal sulfide is characterized by a relatively large particle size by a high settling rate and by ease of filterability.

9 Claims, No Drawings

PRECIPITATION OF FILTERABLE NICKEL AND/OR COBALT SULFIDES FROM ACID SOLUTIONS

The present invention is concerned with the precipitation of nickel, cobalt and zinc sulfides and, more particularly, with the precipitation of these metals as sulfides by means of addition of hydrogen sulfide to aqueous solutions containing metal values.

Metals such as nickel, cobalt and zinc have been precipitated from aqueous solutions by means of hydrogen sulfide; the only criteria being that the solutions themselves not be sufficiently oxidizing with respect to the hydrogen sulfide so as to produce inordinate amounts of free sulfur. Generally, in laboratory analytical techniques, nickel, cobalt and zinc are precipitated as sulfides from alkaline or neutral media. Assuming that the metals are present in solution in association with anions such as sulfate or chloride, the addition of hydrogen sulfide to form metal sulfide will result in the formation of free-acid. In order to avoid the occurrence of very low pH solutions, it has been the practice to either start the hydrogen sulfide addition at a relatively high pH or to include buffers in the metal-containing solutions.

If it is desired to recover metal on a relatively large scale from leach-water solutions or the like, such as produced in hydrometallurgical operations, the classic techniques of carrying out sulfide precipitation by means of hydrogen sulfide are not practical. Precipitates formed when the metal-containing solution is at a high initial pH generally are colloidal or semi-colloidal in nature, very difficult to filter and have a low bulk density when dry. The use of buffers on a large scale is very costly, so much so, in fact, as to make the recovery of nickel, cobalt or zinc as sulfides from adequately buffered solutions economically unattractive.

One process which the prior art has carried out on a commercial scale involves the precipitation of sulfides by means of hydrogen sulfide under pressure. Superatmospheric pressure precipitation of nickel sulfide, for example, at a pressure of about 7 to about 10 atmospheres gauge, results in a readily filterable, low moisture, fast settling, large particle size, high-bulk density product. However, superatmospheric pressure plants have many disadvantages. In particular, they are expensive and require expensive auxiliary equipment. Because of acid generated in the process as discussed hereinbefore, metal precipitation is not complete. Furthermore, difficult corrosion problems are encountered.

It has now been discovered that by means of special control of processing parameters, a metal sulfide product, similar to the product produced by pressure precipitation can be obtained at atmospheric pressure and at temperatures less than about 100° C.

It is an object of the present invention to provide a process for producing sulfides of nickel, cobalt or zinc.

Another object of the present invention is to provide a new process for the production of nickel sulfide in the form of a fast settling, readily filterable, large particle size, highbulk density powder.

Other objects and advantages will become apparent from the following description.

Broadly stated, the present invention contemplates a process wherein an aqueous solution containing ions of metals of the group consisting of nickel, cobalt and zinc, associated with anions not substantially oxidizing to hydrogen sulfide and having a pH of about 2.0 to 3.0 is treated with hydrogen sulfide at a temperature of at least about 50° C., e.g., about 50° C. to about 80° C., for such time as is necessary to precipitate metal as sulfide from the solution. During the time required for reaction the pH of the solution is maintained within the range of 2.0 to 3.0 by addition of a base added at a rate essentially equivalent to the rate of formation of free acid. The invention is most particularly applicable to the precipitation of nickel and cobalt sulfides which are thereby produced in a readily filterable form which, upon recovering and drying, provides a high bulk-density product.

The process of the present invention is advantageously carried out at about atmospheric pressure and a temperature of about 75° C. As used in this specification and claims, the term "atmospheric pressure" when applied to the pressure of hydrogen sulfide entering into the reaction includes not only pressures of about 760 millimeters of mercury, but also slightly increased and decreased pressures, for example, pressures within the range of about 500 to about 1000 millimeters of mercury.

It is an important feature of the present invention that, during the precipitation of sulfides, the pH be maintained within the range of 2.0 to 3.0. This is accomplished by continually adding a base to the solution at a rate equivalent to the rate of reaction of hydrogen sulfide to neutralize acid produced thereby. It is important when adding the base which can be, for example, gaseous ammonia, ammonium hydroxide or aqueous sodium hydroxide, to avoid localized areas of concentration which have high hydroxyl ion content. Consequently, it is highly advantageous for the process of the present invention to be carried out in apparatus which permits vigorous agitation of the solution. Such vigorous agitation as, for example, by a rapidly rotating turbine impeller not only prevents localized high pH areas, but also increases the efficiency of utilization of hydrogen sulfide by breaking up large gas bubbles into very small gas bubbles which allow greater surface area for absorption of hydrogen sulfide by the solution. Whatever means of agitation are used, it is, of course, desirable that the reagents, hydrogen sulfide and base, enter into the reaction system at points of high agitation so that localized volumes of abnormally high concentration will be avoided as much as possible. It is also advantageous, where possible, to locate the entry port for hydrogen sulfide on the opposite side of the reaction chamber from the entry port through which base enters.

Nickel, cobalt and zinc ions precipitated as sulfides in accordance with the present invention can be present in aqueous solution as the chloride sulfate or in association with any other anions which will not react with hydrogen sulfide. The solutions containing the metal ions can also contain other materials which do not interfere with the precipitation of sulfides. For example, the solutions can contain ammonium or sodium sulfates, or chlorides, calcium and magnesium salts and like materials. It can be useful to correlate the character of the base used to neutralize acid with the character of the anions in solution. For example, with chloride solutions, lime can possibly be used as a base. However, in sulfate solutions, addition of lime would cause formation of calcium sulfate and thus contamination of the sulfide precipitate. In order to avoid inefficient use of hydrogen sulfide, the nickel, cobalt and zinc in solution should preferably be present as divalent cations. When following the teachings of the present invention with respect to the precipitation of nickel as sulfides, the particular sulfide precipitated will be either a gray-green nickel sulfide having about 1.03 sulfur atoms per each nickel atom, or a black nickel sulfide having a 1 to 1 atomic ratio of sulfur to nickel. It is desirable to avoid the precipitation of $Ni_3S_4$, which is essentially amorphous and colloidal in nature.

As those skilled in the art will readily appreciate, the process of the present invention can be carried out either batchwise or continuously and, if desired, seeding can be used. When operating with batches, completion of the reaction can be determined by withdrawal of samples and analysis of the filtered solution. It is more convenient, however, to determine completion of the reaction by reference to redox potential between a platinum electrode and the standard calomel electrode. A cell redox potential of $-350$ millivolts in a sulfate solution neutralized with sodium hydroxide is indicative of completeness of precipitation of nickel sulfide, i.e., that less than about 0.5 milligrams of nickel ion per liter remain in solution. Those skilled in the art will appreciate that with other metals and with other solutions a somewhat different redox potential may be used as a standard for completion of the precipitation reaction.

For the purpose of giving those skilled in the art a better understanding or better appreciation of the present invention, the following examples are given.

EXAMPLES

An aqueous solution resulting from acid leaching of a vapometallurgical residue and containing about 19 grams per liter (gpl) of nickel ion, about 0.5 gpl of cobalt ion, about 6.3 gpl of ammonium ion and about 48.6 gpl of sulfate ion was divided into a number of parts of equal volume. Each part was adjusted to a specific pH with sulfuric acid and the adjusted solutions comprised the solutions used in Examples I to III. Each of the solutions was placed in a reactor open to the atmosphere and equipped with a stirrer, inlet means for hydrogen sulfide and ammonia at locations of high agitation and redox potential measuring system consisting of a platinum electrode and a standard calomel electrode both in contact with the solution and connected to a means of measuring the potential difference therebetween. The temperature of the solutions in the reactor was adjusted to 75° C., hydrogen sulfide and gaseous ammonia were introduced at rates regulated to maintain the original acidity of the solutions and the reactions were continued until the redox potential of less than about $-340$ millivolts was obtained. Results observed as to the precipitation reactions, the characteristics of the sulfide-solution, the slurry produced, the dried filter cake of sulfide product and the dried sulfide product are set forth in Table I.

TABLE I

| Example No. | I | II | III |
|---|---|---|---|
| Reaction |  |  |  |
| pH | 2.0 | 2.5 | 3.0 |
| Time (minutes) | 40 | 23 | 22 |
| Redox M.V. (initial) | +330 | +210 | +220 |
| Redox M.V. (final) | −345 | −420 | −375 |
| slurry |  |  |  |
| Settling Rate (M/hr) | 206 | 134 | 96 |
| % Solids in underflow | 59 | 49 | 44 |
| Precipitate |  |  |  |
| Moisture (%) | 13 | 21 | 25 |
| Dry weight (parts by weight) | 13.5 | 13.5 | 13.5 |
| Bulk Density (g/cm³) | 1.5 | 0.99 | 0.98 |
| Specific Gravity | 5.0 | 4.7 | 4.9 |
| % retained on 325 mesh screen | 96 | 74 | 46 |

In contrast to the results set forth in Table I, a fourth part of the solution employed in Examples I to III was adjusted to and maintained at a pH of 4.0 and subjected to hydrogen sulfide treatment under the same conditions and in the same apparatus as pertinent to Examples I to III. Noteworthy among the differences resulting from the use of the higher pH of 4.0 are a notably slower settling rate (57 M/hr) and a significant decrease in particle size of the dry sulfide precipitate (only about 2.5% retained on a 325 mesh screen) a higher moisture content of about 30% in the precipitate, a lower bulk density of about 0.80 g/cm³. Attempted operation of the hydrogen sulfide precipitation at about a pH of 1.0, that is, on the more acid side of the pH range of about 2.0 to about 3.0 as required in accordance with the present invention results in essentially no precipitation of zinc, nickel or cobalt sulfide.

Effects brought about by altering the temperature of sulfide precipitation are shown by the data set forth in Table II. This data was obtained using portions of the leach solution described hereinbefore treated under the same conditions (except for temperature) and in the same apparatus and using the same reagents as employed in Example III. The tests designated by Roman numerals in Table II represent examples of the process of the present invention and those designated by letters in Table II represent procedures outside the scope of the present invention. All the tests reported in Table II were conducted at a pH of 3.0.

TABLE II

| Test Designation | A | B | IV | V | VI | C | D |
|---|---|---|---|---|---|---|---|
| Temperature ° C. | 35 | 45 | 55 | 65 | 75 | 85 | 95 |
| Settling Rate (M/hr) | 5 | 39 | 80 | 97 | 93 | 121 | 141 |
| Underflow % Solids | 6 | 14 | 25 | 35 | 41 | 47 | 50 |
| Filter Cake % Water | 85 | 63 | 48 | 35 | 31 | 17 | 17 |
| Bulk Density (g/cm³) | 0.2 | 0.4 | 0.83 | 0.97 | 0.85 | 1.01 | 1.16 |
| $H_2S$ efficiency (%) | 52 | 55 | 86 | 78 | 77 | 55 | 50 |
| NiS% + 200* | 0 | 0 | 19 | 15 | 20 | 0 | 0 |
| NiS% + 325** | 0 | 0 | 51 | 56 | 67 | 45 | 32 |

*% retained on a 200 mesh screen
**% retained on a 325 mesh screen

The data in Table II shows that sulfide precipitation of nickel and cobalt at temperatures below about 55° C. produces a low bulk density product of very fine particle size. At temperatures above 80° C. and below about 100° C. the nickel sulfide product has a satisfactory bulk density and settling rate but is of a finer particle size than that product produced in the temperature range of 50° C. to 80° C. Factors which militate against the operation at temperatures higher than about 80° C. include lowered efficiency of use of hydrogen sulfide in vessels open to the atmosphere, excessive evaporation of corrosive liquids and inability to use, on a continuous basis, reaction vessels made of glass reinforced polyester resin which is essentially immune to corrosion, but which has a practical temperature limit of use of about 80° C. to 100° C.

Details of additional examples of the process of the present invention are set forth in Table III.

TABLE III

| Example No. | VII | VIII |
|---|---|---|
| Solution Composition |  |  |
| $Ni^{++}$ (gpl) | 19 | 19 |
| $Co^{++}$ (gpl) | 0.5 | 0.5 |

TABLE III-continued

| Example No. | VII | VIII |
|---|---|---|
| Anion (s) | $SO_4^=$ | $SO_4^=$ |
| Process Conditions | | |
| Temperature ° C. | 75 | 75 |
| pH | 3.0 | 2.5 |
| Type of Base | $NH_4OH$ | NaOH |
| Slurry Character | | |
| Settling Rate (M/hr) | 100 | 100 |
| Underflow % Solids | 39 | 46 |
| Precipitate | | |
| % $H_2O$ | 30 | 20 |
| Bulk Density (g/cm$^3$) | 0.88 | 0.78 |
| % + 200 | 22 | 86 |
| % + 325 | 73 | 98 |

The data in Table III shows particularly that sodium hydroxide and ammonium hydroxide are effective bases for neutralizing acid produced in the precipitation of sulfides by means of hydrogen sulfide and that operation of the process at a pH of 2.5 and a temperature of 75° C. is highly advantageous.

Although the present invention has been described in conjunction with preferred embodiments, it is to be understood that modifications and variations may be resorted to without departing from the spirit and scope of the invention, as those skilled in the art will readily understand. Such modifications and variations may be resorted to without departing from the spirit and scope of the invention and appended claims.

We claim:

1. A process for the precipitation of sulfides of the group consisting of nickel and cobalt sulfides and mixtures thereof comprising contacting at a temperature of about 50° C. to about 100° C. an aqueous solution having a pH of about 2.0 to about 3.0 and containing ion of metal of the group consisting of nickel and, cobalt with atmospheric pressure hydrogen sulfide and maintaining the pH of said solution within said range of about 2.0 to about 3.0 throughout the duration of reaction with said hydrogen sulfide by addition of base to said solution whereby sulfide thus precipitated is a fast settling, readily filterable, low moisture, large particle size product having a high-bulk density when dry.

2. A process as in claim 1 wherein the temperature is about 50° C. to about 80° C.

3. A process as in claim 1 wherein the pH is maintained at about 2.5.

4. A process as in claim 1 wherein the solution contains sulfate ion.

5. A process as in claim 4 wherein the base is selected from the group consisting of ammonia, ammonium hydroxide and aqueous sodium hydroxide.

6. A process as in claim 1 wherein the aqueous solution is subjected to vigorous agitation while hydrogen sulfide is in contact therewith.

7. A process as in claim 1 wherein the aqueous solution contains nickel ion.

8. A process as in claim 7 wherein the solution also contains sulfate ion.

9. A process as in claim 8 wherein the temperature is maintained at about 75° C. and the pH is maintained at about 2.5.

* * * * *